United States Patent [19]

Anderson

[11] 3,926,865

[45] Dec. 16, 1975

[54] PROCESS FOR POLYMERIZING LACTAMS IN THE PRESENCE OF AZODICARBOXYLATE AND ISOCYANATE

[75] Inventor: Norman Stewart Anderson, Blackley, England

[73] Assignee: Imperial Chemical Industries Limited, London, England

[22] Filed: Aug. 27, 1974

[21] Appl. No.: 500,883

Related U.S. Application Data

[63] Continuation of Ser. No. 357,652, May 7, 1973, abandoned, which is a continuation-in-part of Ser. No. 229,458, Feb. 25, 1972, abandoned.

[30] Foreign Application Priority Data

May 4, 1971 United Kingdom............... 6026/71

[52] U.S. Cl........... 260/2.5 N; 260/2.5 A; 260/78 L
[51] Int. Cl.²............................................. C08J 9/00
[58] Field of Search............. 260/2.5 N, 2.5 R, 78 L

[56] References Cited
UNITED STATES PATENTS

| 3,095,387 | 6/1963 | Kleinfeld et al.................. 260/2.5 R |
| 3,236,789 | 2/1966 | Fuller............................... 260/2.5 N |
| 3,332,895 | 7/1967 | Munn................................ 260/2.5 N |
| 3,376,237 | 4/1968 | Fuller............................... 260/2.5 N |
| 3,645,928 | 2/1972 | Wakamura et al. ............. 260/2.5 N |

*Primary Examiner*—Richard B. Turer
*Attorney, Agent, or Firm*—Cushman, Darby & Cushman

[57] ABSTRACT

This invention relates to a process for the manufacture of polyamides and polyamide foams, particularly the production of foams in a polymerizing lactam mixture comprising forming a mixture of (1) a lactam having at least seven ring members which is associated with 0.01 to 0.5% by weight of water, (2) an alkali metal salt of azodicarboxylic acid, wherein the metal salt of azodicarboxylic acid is present in an amount at least equimolar with the amount of water present, and polymerizing said lactam under anionic polymerization conditions, whereby said metal salt of azodicarboxylic acid enables polymerization to take place even though said lactam is initially associated with a considerable amount of water.

9 Claims, No Drawings

PROCESS FOR POLYMERIZING LACTAMS IN THE PRESENCE OF AZODICARBOXYLATE AND ISOCYANATE

This is a continuation of application Ser. No. 357,652 filed May 7, 1973, now abandoned which is a continuation-in-part of application Ser. No. 229,458, filed Feb. 25, 1972 now abandoned. It is known from U.K. Specifications No. 918,059 to manufacture polyamide foam from a lactam with at least 7 ring members by polymerization at temperatures above its melting point and below the melting point of the resultant polyamide with the aid of an alkaline catalyst, and optionally in the presence of a polymerization activator, the reaction being carried out in the absence of substances containing or forming hydroxyl groups and in the presence of agents which, under the prevailing conditions of polymerization, volatilise or decompose with the evolution of gas thereby causing the polymerization product to expand. Suitable alkaline polymerization catalysts are alkali and alkaline earth metals, alkali-lactam compounds, potassium hydroxide, potassium carbonate, sodium methylate, sodium amide or calcium oxide. Suitable polymerization activators are acid derivatives, for example carboxylic acid-halides, esters, anhydrides, etc. The anhydrous conditions prescribed in this specification are essential for the production of good quality foams in this way.

U.K. Pat. No. 1,112,515 claims a process for the production of polyamide foams from lactams, which comprises heating a lactam or a mixture of lactams having at least seven ring members with at least 1 mol % based on lactam, of an organic isocyanate or blocked isocyanate at a temperature above 130°C in the presence of an alkali-metal or alkaline-earth metal compound, the molar ratio of isocyanate to alkalimetal or alkaline-earth metal compound being greater than 5:1. This process is said to be capable of being carried out even when the lactam has a water content of 0.3 percent by weight. However organic isocyanates in the presence of water form by-products which have deleterious effects on the polymerization process.

It is a feature of the invention herein described that the process is tolerant to the presence of water without any undesirable side effects and thus obviates the need for scrupulous drying of the polymerization materials.

The formation of foams from preformed polyamides by melting them in the presence of a blowing agent is also known. However this system is so very different from the polymerizing system wherein the polymer viscosity is much more time and temperature dependent and other factors are different, that blowing agents effective in the molten polymer system are ineffective in the polymerizing system.

We have now found that lactams may advantageously be polymerized and, if desired, simultaneously foamed in the presence of a salt of azodicarboxylic acid.

According to the invention we provide a process for the manufacture of a polyamide comprising heating a lactam having at least 7 ring members under anionic polymerization conditions in the presence of an alkali metal salt of azodicarboxylic acid.

Salts of azodicarboxylic acid which may be used are for example the sodium or potassium salts.

The expression "anionic polymerization conditions" means that an alkaline catalyst is present (and in certain embodiments of the invention the azodicarboxylic acid salt itself may function as such a catalyst) and that the heating is carried out at temperatures known to be effective in inducing polymerization in the presence of such catalysts. According to the effectiveness of the catalyst and any catalyst activator which may also be present, suitable temperatures are generally from 100°to about 250°C, and more particularly 140°to 200°C.

It is not therefore necessary for the azodicarboxylic acid salt to be free from alkaline material, for example bicarbonate, though in practice a consistent degree of purity is desirable if consistent results are to be obtained.

The alkali metal salt of azodicarboxylic acid can perform three distinct functions in the polymerization of lactams. First, it has a desiccating effect to react with water to form relatively harmless byproducts which permits the polymerization of the lactam to proceed uninhibited. Second, a proportion of the azodicarboxylate not consumed as a desiccant, may, in cooperation with an organic isocyanate, function jointly as an active catalyst species which in combination with further isocyanate catalyzes the polymerization. Third, a proportion of the azodicarboxylate not consumed as a desiccant can function as a thermally decomposable blowing agent. It will be appreciated that the azodicarboxylate may perform only one, a combination of two, or all of these functions depending on the amount of water, azodicarboxylate and isocyanate present in the reaction mixture.

The first function, namely the azodicarboxylate acting as a desiccant, is believed to occur due to the following reaction of the azodicarboxylate with water:

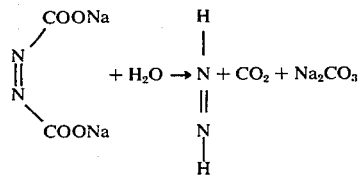

with the unstable azo compound decomposing as follows:

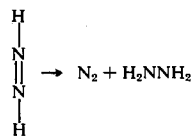

The function of the azodicarboxylate as a desiccant is disclosed in Kleinfeld, U.S. Pat. No. 3,095,387. However, the use of the azodicarboxylate in Kleinfeld differs from that of the present process in that oxidation conditions and oxidizing curing agents are present in the production of the polysulfide polymers in Kleinfeld to further decompose the hydrazine as follows:

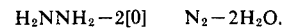

In contrast, however, the process of the present invention does not involve the presence of oxidizing agents or oxidative conditions to further decompose the hydrazine. The blowing function of the azodicarboxylate in the present lactam polymerization, as discussed below, takes place in the absence of water, involving an additional quantity of azodicarboxylate to that reacting with water, and can thus be described as a thermally decomposable blowing agent according to the following reaction:

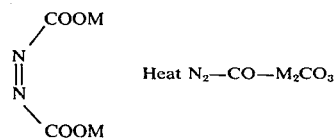

where M is an alkali metal.

The second function of the azodicarboxylate in the present invention, namely acting as a catalyst, is achieved by interaction of the azodicarboxylate with some of the organic isocyanate to produce an active catalyst which in combination with further isocyanate catalyzes the lactam polymerization, the residual azodicarboxylate being unavailable to act as a thermally decomposable blowing agent at the appropriate stage of polymerization.

Thus, if the azodicarboxylate is equimolar with the water present in the lactam polymerization or less, the desiccating function will prevail because substantially all or nearly all the azodicarboxylate reacts with water, and no blowing effect or catalyzing effect will be present. If the azodicarboxylate is at least equimolar to the water present, but no isocyanate is present, the azodicarboxylate will first react with water and then thermally decompose and act as blowing agent. If an isocyanate is present in the reaction mixture, the azodicarboxylate will react with any water present, form a combined active catalyst species with the isocyanate and act as a blowing agent. It will be further noted that if water is removed, for example if the reaction mixture is dried by nitrogen sparging, the amount of azodicarboxylate required to act as a desiccant is correspondingly reduced.

Thus in a first embodiment of the invention an alkaline catalyst and if desired a polymerization activator is present in addition to the azodicarboxylic acid salt. The azodicarboxylic acid salt then enables polymerization to take place even when the lactam used as starting material contains a considerable amount of water. Thus for example a lactam (e.g. commercial caprolactam) containing from 0.01 to 0.5 percent by weight of water may be polymerized by this particular embodiment. The proportion of azodicarboxylic acid salt used in this embodiment should be at least equimolar to that of the water present. Any excess of azodicarboxylic acid salt may decompose thermally, thereby blowing the polymerization product into a foam, but by avoiding such excess, unfoamed polyamides may be obtained.

In a further embodiment the process of the invention is carried out in the additional presence of an organic isocyanate or blocked isocyanate. Examples of organic isocyanates are alkyl or aryl mono-or polyisocyanates, particularly dodecyl isocyanate, phenylisocyanate, hexamethylene diisocyanate, tolylene diisocyanate and diphenylmethane diisocyanate. Blocked isocyanates, which form isocyanates on heating, include reaction products of isocyanates with amides, and particularly lactams, for example hexamethylene-bis-carbamidocaprolactam, formed from hexamethylene diisocyanate and caprolactam. Polyisocyanates may also be used.

In this embodiment, as in the first embodiment, the axodicarboxylic salt enables lactams containing considerable amounts of water to be used as starting material. Additionally the azodicarboxylic acid salt, together with the isocyanate or blocked isocyanate, acts as a catalyst and may also act as blowing agent so that the product is a polyamide foam. It is found that by this embodiment foam may be produced which has properties superior to those obtained by the process of U.K. Pat. No. 1,112,515 being of lower density while the polyamide itself is of higher inherent viscosity (I.V.) so that the foams have excellent strength.

For the production of polyamide foams having such advantageous properties the molar ratio of isocyanate or blocked isocyanate to azodicarboxylic acid salt may be for example from 0.1:1 to 10:1, especially good results being obtained when the ratio is from 0.2:1 to 5:1. these ratios preferably exclude any azodicarboxylic acid salt required to overcome the effect of any water present in the reactants.

The process of the invention may conveniently be operated by a casting technique, that is by filling a mold with the mixture of ingredients, and allowing foaming and polymerization to take place at the operative temperature. Thus the mold itself may be heated, or the mixture may be heated before transfer into an insulated mold at an appropriate moment. Advantageously the temperature in the mold should be below the melting point of the polyamide in order to avoid production of a product containing an undesirably high proportion of unpolymerized lactam in equilibrium with polyamide.

It is also possible to operate the process of the invention by extruding the mixture of ingredients using a screw extruder or injection molding machine and subsequently shaping the polyamide. In such a process the barrel temperature of the machine may require to be higher than the melting point of the polyamide.

For most effectively carrying out a process according to this invention an azodicarboxylic acid salt and a lactam should be intimately mixed and this may be conveniently done by grinding the two compounds together to a fine powder which will then produce a good dispersion or solution of the salt in the molten lactam at the start of polymerization.

The following Examples illustrate the invention and the manner in which it may be performed.

EXAMPLE 1

This example illustrates the deseccating effect of the azodicarboxylate.

Caprolactam (20.0 g of commercial material) and potassium azodicarboxylate (0.150 g) were placed in a polymer tube and blanketed under nitrogen. The lower end of the polymer tube was heated in a vapour bath at 160°C for 15 minutes. Sodium hydride (0.110 g) and diphenyl carbonate (0.150 g) were then added and mixed in. Within four minutes, the mixture had set solid to a poorly-foamed block of density 0.91 g/cc.

In a comparative experiment, where no potassium azodicarboxylate was used, the mixture was still molten and entirely unfoamed after 4 minutes, partly solid after 10 minutes but with a layer of liquid over the solid. This liquid layer had not set solid after 30 minutes.

In the first experiment the azodicarboxylate is largely used up in the reaction with water and thus contributes no blowing or catalyzing effect, the catalyst being sodium hydride and the co-catalyst being diphenyl carbonate. The comparative experiment shows that without the azodicarboxylate water is present in the lactam reaction mixture and therefore a deleterious catalyst poison in the polymerization process.

EXAMPLE 2

Caprolactam (34 g of commercial material) was heated in a polymer tube under nitrogen in a vapor bath at 160°C. When molten, the lactam was dried by sparging with dry nitrogen at about 1 liter/minute for 15 minutes. Sodium hydride (0.20 g) was then added and the mixture sparged for a further 10 minutes. Potassium azodicarboxylate (0.34 g) were added and mixed in. The contents of the tube had polymerized in 3 minutes to a foam of density 0.70 g/cc.

The caprolactam was first dried by sparging with nitrogen so that the azodicarboxylate acts only as a thermally decomposable blowing agent, and the sodium hydride and diphenyl carbonate being the catalyst and co-catalyst.

The following Examples 3–10 show the azodicarboxylate acting as an active catalyst species with the isocyanate and a blowing agent, and the isocyanate or blocked isocyanate acting as a co-catalyst and possibly also contributes a small blowing effect.

EXAMPLE 3

Caprolactam (20.0 g of commercial material), hexamethylene diisocyanate/caprolactam adduct (0.5 g; 0.00127 moles) and potassium azodicarboxylate (0.28 g; 0.0029 equivalents) were mixed together at room temperature in a polymer tube. The tube was blanketed under nitrogen and placed in an oil bath at 200°C. Stirring was started immediately and was stopped after 5½ minutes, when the mixture was viscous enough to support a foam. After 15 minutes in the oil bath, the tube was removed to cool in air. The resulting foam had a density of 0.32 g/cc. I.V. of the polymer of 90 percent formic acid was not measurable since a gel was formed.

Comparative Examples A

When potassium stearate (0.932 g; 0.0029 equivalents) was used in place of the potassium azodicarboxylate in the procedure of Example 3, the mixture could not support a foam until 7½ minutes had elapsed in the oil bath; the density of the resulting foamed block was 0.74 g/cc. I.V. of the polymer in 90 percent formic acid was 1.178.

When potassium carbonate (0.20 g: 0.0029 equivalents) was used in place of the potassium azodicarboxylate in the procedure of Example 3, the stirrer was removed after 6 minutes when the mixture could support a foam; the density of the resulting foamed block was 0.74 g/cc. I.V. of the polymer in 90 percent formic acid was not measurable because afgel was obtained.

EXAMPLE 4

Caprolactam (20.0 g of commercial material), hexamethylene diisocyanate/caprolactam adduct (0.50 g; 0.00127 moles), water (0.018 ml) and potassium azodicarboxylate (0.28 g; 0.0029 equivalents) were mixed together at room temperature in a polymer tube. The tube was blanketed under nitrogen and placed in an oil bath at 200°C. Stirring was started immediately and was stopped 7 minutes later when the mixture had become viscous enough to support a foam. After 15 minutes in the oil bath, the tube was removed to cool in air. The resulting foam had a density of 0.62 g/cc. I.V. of the polymer in 90 percent formic acid was 2.838.

Comparative Examples B

When potassium stearate (0.932 g: 0.0029 equivalents) replaced the potassium azodicarboxylate in the procedure of Example 4, the mixture could not support a foam until the mixture had been 11 minutes in the oil bath; the resulting block of polymer was substantially non-foamed with density of 0.95 g/cc. I.V. of the polymer in 90 percent formic acid was 1.285.

When potassium carbonate (0.20 g: 0.0029 equivalents) replaced the potassium azodicarboxylate in the procedure in Example 4, the mixture could not support a foam until it had been 20 minutes in the oil bath. The resulting polymer was largely non-foamed with a density of 0.98 g/cc. I.V. of the polymer in 90 percent formic acid was 1.602.

EXAMPLE 5

Caprolactam (18.0 g), dodecanolactam (2.0 g), hexamethylene diisocyanate/caprolactam adduct (1.310 g: 0.0033 moles) and potassium azodicarboxylate (0.097 g; 0.001 equivalents) were placed in a polymer tube and mixed together at room temperature. The tube was blanketed under nitrogen and placed in an oil bath kept at 200°C. After 15 minutes, the mixture had set to a foam of density 0.27 g/cc.

Comparative Example C

When the potassium azodicarboxylate used in Example 5 was replaced by potassium bicarbonate (0.100 g; 0.001 equivalents) it took 45 minutes for the mixture to set to a foam of density 0.64 g/cc.

EXAMPLE 6

Caprolactam (14.0 g), dodecanolactam (6.0 g), hexamethylene diisocyanate/caprolactam adduct (1,310 g; 0.0033 mols) and potassium azodicarboxylate (0.097 g; 0.001 equivalents) were placed in a polymer tube and mixed together at room temperature. The tube was blanketed under nitrogen and placed in an oil bath kept at 180°C. After 24 minutes, the mixture had set to a foam of density 0.30 g/cc.

Comparative Example D

When the potassium azodicarboxylate used in Example 6 was replaced by potassium bicarbonate (0.100 g; 0.001 equivalents), it took about 90 minutes for the mixture to set a foam of density 0.48 g/cc.

EXAMPLE 7

Caprolactam (20.0 g) and potassium azodicarboxylate (0.097 g; 00010 equivalents) were placed in a polymer tube and mixed together at room temperature. Tolylene diisocyanate (0.53 g; 0.0030 moles) was then added and mixed in. The tube was then blanketed under nitrogen and placed in an oil bath kept at 200°C. After 14 minutes, the mixture had set to a foam. The foam was heated for a further 15 minutes and then allowed to cool. The density of the foam produced was 0.33 g/cc. Methanol (refluxing for 16 hours) extracted 11 percent by weight of the foam.

Comparative Example E

When the potassium azodicarboxylate used in Example 7 was replaced by potassium bicarbonate (0.100 g; 0.0010 equivalents) in the above process, the mixture did not set as a foam until about 54 minutes heating in the bath had elapsed. The foam was heated for a further 15 minutes after setting and then cooled. Foam density was 0.40 g/cc. Methanol (refluxing for 16 hours) extracted 32 percent by weight of the foam.

EXAMPLE 8

Caprolactam (20.0 g), which had been recrystallized three times from toluene, was placed in a polymer tube and blanketed under nitrogen. The tube was placed in an oil bath kept at 200°C. After the lactam had melted, it was sparged with dry nitrogen gas at the rate of about 1 liter per minute for 10 minutes. Hexamethylene diisocyanate/caprolactam adduct (0.500 g; 0.00127 moles) and potassium azodicarboxylate (0.280 g; 0.0029 equivalents) were then quickly added to the dry lactam and mixed in. The nitrogen inlet pipe was then raised from the lactam melt to provide a blanket only. 1½ minutes after adding the catalysts, the mixture had set to a foam. The foam was left another 15 minutes in the oil bath and then removed to cool. The foam had a density of 0.27 g/cc. Methanol extractable material was 6.5 percent.

Comparative Examples F

When potassium stearate (0.932 g; 0.0029 equivalents) replaced the potassium azodicarboxylate in the process of Example 8, the time from the addition of the catalysts until the mixture had set solid was 2½ minutes. The foam had a density of 0.45 g/cc. Methanol extractable material was 13 percent.

When potassium carbonate (0.200 g; 0.0029 equivalents) replaced the potassium azodicarboxylate in the process of Example 8, the time from the addition of the catalysts until the mixture had set solid was 1½ minutes. The foam had a density of 0.36 g/cc. Methanol extractable material was 10 percent.

EXAMPLE 9

A mixture of finely divided caprolactam (100 g), potassium azodicarboxylate (2.80 g; 0.029 equivalents) and hexamethylene diisocyanate/caprolactam adduct (5.00 g; 0.0127 moles) were placed in a mold. 1.0 ml of a silicone surfactant was then added to the solid mixture. The mold was blanketed under nitrogen and heated in an oil bath at 200°C. After about 1 hour, the mold was removed from the heat to cool. The resulting foam had an overall density of 0.28 g/cc but was somewhat uneven, and had a layer of largely solid polymer at the base of the block.

When this procedure was modified by agitating the mold in the oil bath, a foam block of overall density 0.18 g/cc was obtained. The foam structure was more even.

EXAMPLE 10

Caprolactam (20.0 g), sodium azodicarboxylate (0.234 g; 0.0029 equivalents) and hexamethylene diisocyanate/caprolactam adduct (0.500 g; 0.00127 moles) were mixed together as solids at room temperature in a polymer tube. The tube was blanketed under nitrogen and placed in an oil bath kept at 200°C. 22 minutes after placing the tube in the bath, the mixture had set as a foam. Heating was continued for a further 15 minutes and the tube removed from the heat to cool. The foam had a density of 0.50 g/cc. Methanol extractable material was 8.5 percent.

Comparative Examples G

When sodium formate (0.196 g; 0.0029 equivalents) replaced the sodium azodicarboxylate in the process of Example 10, it tool 30 minutes in the oil bath before the mixture set as a foam. Foam density was 0.54 g/cc. Methanol extractable material was 9.6 percent.

When sodium bicarbonate (0.242 g; 0.0029 equivalents) replaced the sodium azodicarboxylate in the process of Example 10, the mixture has not set solid after 40 minutes in the oil bath.

Comparative Examples H

A nylon 6 polymer (20.0 g.) was placed in a tube and blanketed under nitrogen. The tube was then placed in an oil bath at 240°C and the contents stirred until completely molten. Sodium azodicarboxylate (0.22 g) was then added and the melt rapidly stirred for 30 seconds to disperse the blowing agent. The stirrer was removed and the melt after a further 3 minutes heating was removed from the oil bath to cool. The product was substantially unfoamed and had a density of 1.00 g./cc.

In a similar process using potassium axodicarboxylate (0.20 g) in place of the sodium salt a very slightly foamed product of density 0.92 g./cc. was formed.

In a control experiment using no azodicarboxylate salt the product had a density of 1.08 g./cc.

EXAMPLE 11

This represents a typical example of the simultaneous polymerization and foaming of a lactam in the presence of potassium azodicarboxylate.

Commercial caprolactam (20 g.) was ground to a powder and thoroughly mixed with potassium azodicarboxylate (0.28 g.) at room temperature. The mixture was transferred to a polymerization tube and hexamethylene dissocyanate (0.27 g.) was added. The mixture was then blanketed under nitorgen and placed in an oil bath at 200°C. After 13 minutes in the oil bath the mixture had polymerized and set to a foam of density 0.33 g./cc.

Comparative Example I

Example 11 was repeated using barium azodicarboxylate (0.37 g.) instead of potassium azodicarboxylate. Even after 30 minutes in the oil bath at 200°C. no polymerization or foaming had occurred.

Comparative Example J

Caprolactam (34 g.) in a polymerization tube was placed in an oil bath at 200°C. and dried by sparging with dry nitrogen for 15 minutes. Sodium hydride (0.20 g.) was then added and the mixture sparged with nitrogen for a further 10 minutes. Barium axodicarboxylate (0.48 g.) and diphenyl carbonate (0.27 g.) were added and mixed in. The mixture polymerized to a solid in about half a minute but the product having a density of 1.06 g./cc. was substantially unfoamed.

Comparative Example K

Comparative Example J was repeated using an oil bath temperature of 160°C. The reaction mixture set in about the minute to a substantially unfoamed solid of density 1.15 g./cc.

The foregoing comparative Examples I-K show conclusively that barium azodicarboxylate is not effective in a process according to the present invention to bring about either polymerization (Example I) of a lactam or foaming (Examples J and K) of a polymerizing lactam.

I claim:

1. A process for the manufacture of a polyamide comprising forming a mixture of (1) a lactam having at least seven ring members which is associated with 0.01 to 0.5 percent by weight of water, (2) and alkali metal salt of azodicarboxylic acid, wherein the metal salt of azodicarboxylic acid is present in an amount at least equimolar with the amount of water present, and (3) an isocyanate or blocked isocyanate which, together with a portion of said alkali metal salt of azodicarboxylic acid, constitutes a catalyst species, and polymerizing said lactam under anoinic polymerization conditions, whereby said metal salt of azodicarboxylic acid enables polymerization to take place even though said lactam is initially associated with a considerable amount of water.

2. A process according to claim 1 wherein the salt is sodium or potassium azodicarboxylate.

3. A process according to claim 1 wherein the isocyanate is selected from the group comprising dodecyl isocyanate, phenyl isocyanate, hexamethylene diisocyanate, tolylene diisocyanate and dipenhylmethane diisocyanate.

4. A process according to claim 1 wherein the blocked isocyanate is hexamethylene-bis-carbamidocaprolactam.

5. A process according to claim 1 wherein the molar ratio of isocyanate or blocked isocyanate to azodicarboxylic acid salt is 0.1:1 to 10:1.

6. A process according to claim 5 wherein the ratio is 0.2:1 to 5:1.

7. A process according to claim 1 wherein the lactam is $\epsilon$-caprolactam.

8. A process as set forth in claim 1 in which the amount of said salt of azodicarboxylic acid exceeds the amount of water on a molar basis and including thermally decomposing a portion of said salt to foam said polyamide.

9. A process according to claim 8 wherein the polymerization and foaming are effected in a mold.

* * * * *

UNITED STATES PATENT OFFICE
CERTIFICATE OF CORRECTION

Patent No. 3,926,865            Dated December 16, 1975

Inventor(s) Norman Stewart Anderson

It is certified that error appears in the above-identified patent and that said Letters Patent are hereby corrected as shown below:

In the Heading, at item [30], change the date of priority to ---March 4, 1971.

Signed and Sealed this twentieth Day of April 1976

[SEAL]

Attest:

RUTH C. MASON
*Attesting Officer*

C. MARSHALL DANN
*Commissioner of Patents and Trademarks*